United States Patent [19]

Dierks et al.

[11] 3,944,698
[45] Mar. 16, 1976

[54] GYPSUM WALLBOARD AND PROCESS FOR MAKING SAME

[75] Inventors: Robert P. Dierks; Robert J. Rillie, both of Des Plaines, Ill.

[73] Assignee: United States Gypsum Company, Chicago, Ill.

[22] Filed: Nov. 14, 1973

[21] Appl. No.: 415,669

[52] U.S. Cl. ............... 428/219; 428/303; 428/317; 428/297; 428/535; 428/538; 156/42
[51] Int. Cl.² .......................................... B32B 3/18
[58] Field of Search ............. 161/55, 59, 78, 82, 84, 161/93, 146, 152, 182, 192, 200; 156/39, 42, 44; 428/219, 297, 303, 317, 535, 538

[56] References Cited
UNITED STATES PATENTS

| 2,803,575 | 8/1957 | Riddell et al. | 156/39 |
| 2,871,134 | 1/1959 | Loechl | 161/200 |
| 3,493,460 | 2/1970 | Windecker | 161/93 |
| 3,616,173 | 10/1971 | Green et al. | 156/42 |

*Primary Examiner*—George F. Lesmes
*Assistant Examiner*—William R. Dixon, Jr.
*Attorney, Agent, or Firm*—Samuel Kurlandsky; Stanton T. Hadley; Donnie Rudd

[57] ABSTRACT

A specially prepared fiber reinforcement and improved gypsum wallboard are disclosed. The fiber reinforcement includes a multiplicity of relatively long fibers which are disposed at the interface of the core and cover sheets of the wallboard and are adhesively bonded to the cover sheets and incorporated predominantly into the portion of the core immediately adjacent to the cover sheets.

14 Claims, 4 Drawing Figures

GYPSUM WALLBOARD AND PROCESS FOR MAKING SAME

BACKGROUND OF THE INVENTION

This invention relates to a gypsum wallboard and more particularly to a novel fiber reinforcement for the wallboard and to a novel process for constructing gypsum wallboard.

In the making of gypsum wallboard, it has frequently been the practice to employ reinforcing fibers in order to strengthen the wallboard. Such fibers are usually incorporated into the stucco slurry which is cast between the front and back paper cover sheets to make up the gypsum wallboard. The fibers tend to reinforce the core in much the same manner as the paper cover sheets which surround the core. These fibers span the local discontinuities in the stucco matrix and unite adjacent zones or agglomerates of matrix particles. The fibers, for instance, reduce the amount of core fragments that might otherwise detach from the board during nailing near an edge of the board where the core is exposed.

Of the many kinds of fibers which are available, only two have been widely used in gypsum board, paper fiber and glass fiber. The paper fiber is the more widely used type of fiber because it is cheaper, but the glass fiber has the advantage of being highly fire resistant and, therefore, is essential in the makeup of many gypsum products which have to meet certain fire specifications. While both types of fiber are used to provide "core integrity", in the event of fire, glass fibers can sustain core integrity for a longer, more critically useful period than paper fibers.

The diameter of individual glass filaments presently used as reinforcing fibers for gypsum board core is less than one-half thousandth of an inch. Because of their small diameter their tensile breaking strength is quite low, less than about 0.07 lb. Their size also makes them easily airborne. The handling of such filaments is facilitated by incorporating numbers of them into a strand called an "end", and combining a number of ends into a larger strand called "roving". For example, a glass fiber reinforcement roving may contain 60 ends, each of which consists of about 200 filaments.

Roving is usually chopped into nearly uniform lengths and conveyed to the gypsum board slurry mixer. These actions tend to separate the roving into a mixture of individual filaments and bundles of filaments. Further disaggregation, as well as dispersion and perhaps some fiber breakage, takes place in the slurry mixer. But the disaggregation is seldom perfect, so gypsum board core normally contains a mixture of individual filaments and bundles of filaments.

When fibers are incorporated into the gypsum slurry, they tend to slow the slurry flow thus slowing the manufacture of the board. In order to speed up the slurry flow to the proper level it is necessary to add excess water to the slurry. This is disadvantageous because: (1) the water added to the slurry must be eventually driven out in the drying process; and (2) the excess water decreases core density and this reduces fiber pull-out resistance.

A further limitation with respect to the fibers which might be incorporated into the gypsum slurry is that the fibers longer than about one-half inch cannot be introduced into present gypsum board slurry mixers because such longer fibers would become entangled and hang up on the pins and other parts of the machine. Moreover, if longer fibers were incorporated into the slurry for the core, they would tend to reinforce the core, but would result in a corresponding impairment in the scoring and breaking properties of the board. In the field when workmen wish to cut a gypsum board, they simply score it through the paper with a knife. The scoring does not usually penetrate deeply into the core and does not sever many of the fibers in the core. Thus, when the board core is snapped, the unsevered fibers that extend across the fracture tend to pull away core aggregates resulting in a very irregular edge which interferes with the fitting of adjacent pieces together and could be a source for complaint. While this situation could perhaps be somewhat minimized by increasing the core density of the board or changing the fiber geometry or using various agents to improve fiber-to-core "bond", none of these are presently practical approaches to improving the pull-out resistance of the fibers to effect a clean break across the scored portion of the board. Increasing the density of the core is impractical because the present market prefers light-weight gypsum board, and additives to improve the bond are not practical because they are presently very expensive. Finally, a change in a glass fiber geometry has been found to be presently uneconomical.

The present invention provides a unique approach to the solution of the foregoing problems. The invention eliminates the need for incorporating excess water in the stucco slurry. Moreover, the invention increases the strength of the board only where it is most needed and in the normally weakest (i.e., transverse) direction, and this strengthening is accomplished without greatly impairing the scoring and breaking properties of the board.

SUMMARY OF THE INVENTION

In accordance with this invention, an improvement is provided in a gypsum board and the process for making gypsum board which features the reinforcement of the gypsum board by means of incorporating into selected portions thereof relatively long reinforcing fibers. In accordance with one embodiment of the invention, the gypsum board having a set gypsum core securely bonded to a paper cover sheet, has a plurality of reinforcing fibers disposed at the interface of the core and at least one of the cover sheets. The fibers have an average length greater than the "critical fiber length" and are affixed to the cover sheet and incorporated principally into the portion of the core immediately adjacent the cover sheet. The "critical fiber length" is a function of the physical characteristics (geometry and strength) of the fiber and of the board core density. It is defined as the shortest length of the particular fiber which will break off before it will pull out from the particular core matrix. It is preferred that the fibers be of glass, that they be oriented at least partially in a direction transverse to the principal orientation of the fibers in the paper cover sheets, and that they be incorporated at both the interfaces of each of the two cover sheets and the core.

The fibers may be incorporated in substantially continuous strands which in one embodiment are bonded to the cover sheets in an undulated pattern. In other embodiments the strands are incorporated in the form of an open fiber mat such as a fish net or scrim arrangement or in the form of an open, chopped strand mat with random fiber orientation.

The improved process for making the gypsum board includes the steps of making a slurry of stucco, casting the stucco between a back and a front cover sheet, with each of the sheets including a bond liner exposed to the slurry, and then drying the slurry so cast so as to form a gypsum core secured to the sheets. The improvement specifically comprises incorporating reinforcing fibers into the wallboard at the interface of the stucco slurry and the bond liner of at least one of the cover sheets, the fibers having average lengths greater than the "critical fiber length" for the gypsum core and the fiber employed.

It is preferred that the incorporating step include the step of securing the reinforcing fibers to the bond liner before the bond liner is brought into contact with the stucco slurry. The securing step may be accomplished by the means of adhesive, and the reinforcing fibers may be flocked onto the adhesively coated liner prior to the casting step. The flocking is preferably done with glass fibers at the rate of at least 3 pounds of glass fibers per 1,000 square feet of board but at a rate insufficient to prevent a secure bond between the core and the cover sheet. The fibers may also be secured to the bond liner by means of an electrostatic flocking process.

In accordance with alternative embodiments of the process, the fibers may be incorporated as continuous strands or they may be incorporated by utilizing continuous open glass fiber mats, as stated above. In this instance, the continuity of the reinforcing material permits other methods to be used to position the reinforcement, in lieu of adhesive or electrostatic attachment. For instance, the reinforcing scrim can be simply placed on the bond liner of the bottom or front sheet and held there by its own weight. The reinforcing scrim can be held against the bond liner of the upper sheet by tension.

DETAILED DESCRIPTION OF THE PREFERRED EMBODIMENTS

Figures 1, 2:
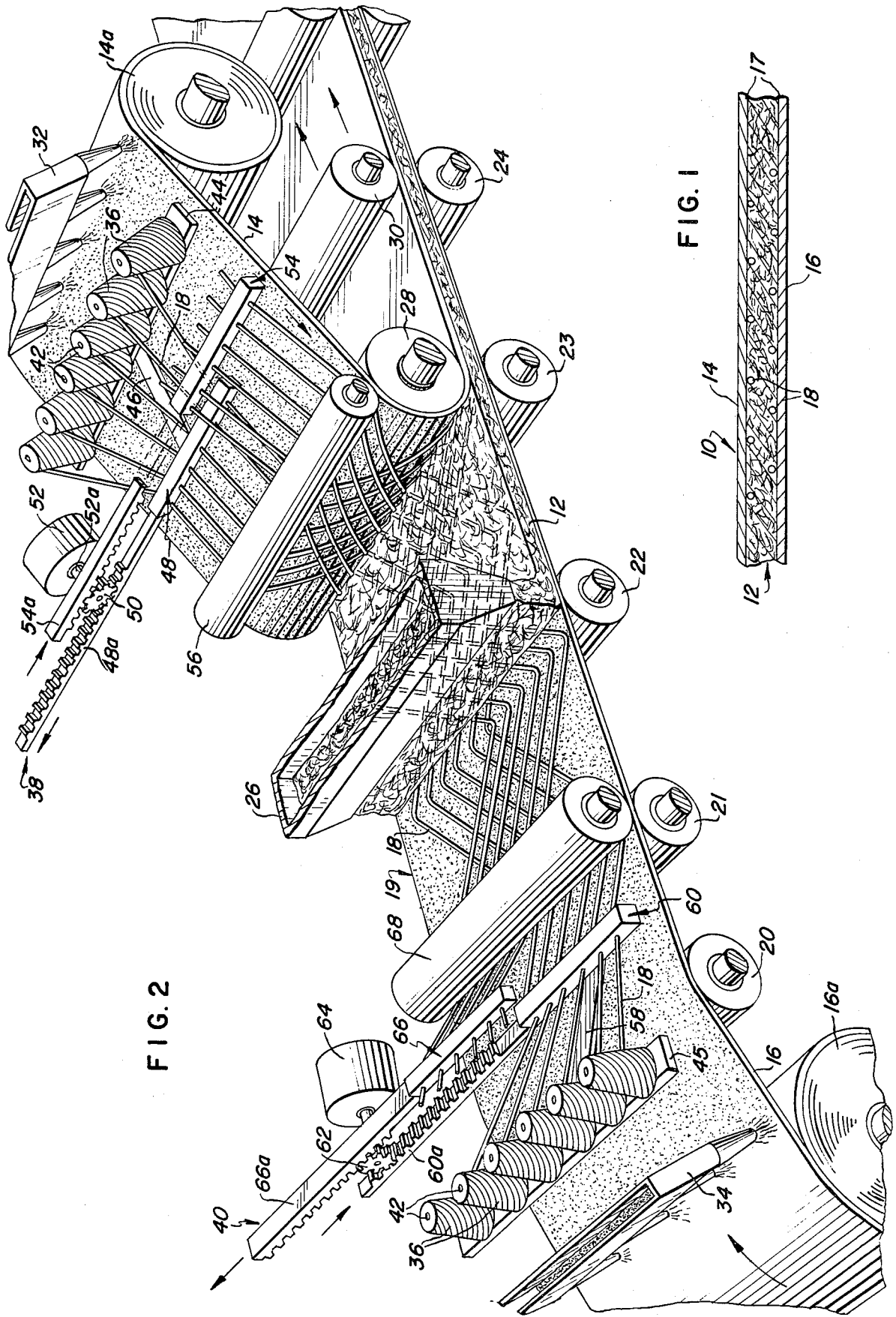
FIG. 1 is an enlarged cross-sectional view of gypsum wallboard constructed in accordance with this invention, the reinforcing fibers being enlarged for illustration purposes only.
FIG. 2 is a schematic perspective view of a gypsum board machine for making reinforced gypsum board of FIG. 1 in accordance with this invention.

The instant invention relates to an improved reinforced gypsum board and the process for manufacturing that board. In FIG. 1, there is illustrated a reinforced gypsum board 10 constructed in accordance with this invention. This board includes a set gypsum core 12 securely bonded to the interior surfaces or bond liners of the paper cover sheets 14 and 16 respectively. At the interface 17 of the core and bond liner of at least one of the cover sheets are a number of reinforcing fibers 18. In the illustrated embodiment, the reinforcing fibers 18 are disposed in the vicinity of, i.e., at or immediately adjacent, the interfaces of the core and each of the cover sheets. As will be further described, however, in certain instances it may be desirable to have these fibers only at or immediately adjacent the interface of one of the cover sheets 14 or 16 and the core 12.

It is preferred that the reinforcing fibers 18 be of the glass fiber type. Glass has several distinct advantages over other types of fibers which could be used, such as, for example, sisal fiber. The glass fibers are incombustible, they are clean and pure, and they have a high modulus of elasticity. The high modulus of elasticity is a very desirable factor because gypsum board core itself is rather brittle. The glass fibers should be free from alkali attack i.e., they should be inert, in order to give proper strength and bonding action.

It is also desirable that the reinforcing fibers extend at least partially in a direction transverse to the orientation of the fibers in the paper cover sheets 14 and 16. The orientation of the fibers in the paper would normally be predominantly in the machine direction which is the length of the paper sheet. The reinforcing fibers 18 preferably extend diagonally so that there is reinforcement in both the longitudinal and transverse directions of the board.

The reinforcing fibers should be separated or form an open reinforcement structure so that the gypsum matrix forming the core 12 will intimately contact and be secured to the bond liner of the cover sheets 14 and 16. The reinforcement structure formed by the fibers 18 may take any of a number of different forms. For example, the reinforcement may be in the form of continuous strands composed of numerous monofilaments that are undulated in a pair or crossing patterns to resemble a net or they may be in the form of an open preformed mat structure resembling a fish net or scrim or even a chopped strand mat with random fiber orientation. Satisfactory reinforcement may be achieved with approximately 3 pounds of fibers per 1000 square feet of interface, with the upper limit on the fibers being that which will not adversely affect the bond between the core and bond liner of the cover sheet.

The reinforcing monofilament fibers are preferably hairlike, having a diameter in the range of between about 0.00026 inch and about 0.00045 inch, which is the present current range of diameters of reinforcing glass fibers used in the core of some boards. The average length of the reinforcing fibers is greater that the "critical fiber length". The critical fiber length for any particular fiber and given board core density is the shortest length of that fiber which will be frictionally gripped by the core with such force that it will break off rather than pull out of the core. Theoretically the force required to pull a fiber out of a gypsum board core matrix derives from the friction between the fiber and the points of contact with the porous core matrix. The greater the length of the fiber, the greater the number of points of contact with the core matrix and the greater the "pull-out resistance". When the length of the particular fiber is increased so that the "pull-out resistance" of the fiber is greater than the tensile strength of the fiber, the fiber breaks before it pulls out. At that point, the "critical fiber length" has been reached. At current board densities, the "critical fiber length" for glass fibers is more than 10 times the current average length for reinforcing glass fibers used to reinforce the core of some boards. Specifically it is preferred that the glass fibers have an average length which is greater than about 10 inches, more than twice the critical fiber length, in order to achieve the proper "pull-out resistance" with the present core density (i.e., 40 lbs./cu. ft.) and fiber being used. As one example, a number of fibers may be intersected by a crack in a cast gypsum sheet. Some of the fibers will be intersected at their midpoint; others will be intersected closer to one end than another. In the latter case, if the encapsulated fiber length on either side of the crack is less than the critical fiber length, the fiber will pull out. If this length, on both sides of the crack, is greater than the critical fiber length, the fiber will break.

This description of critical fiber length may be applied also to scrim or continuous strand reinforcement even though the strands in each consist of more than a single monofilament. For instance, such strands may be comprised of one or more "ends" each of which contains about 200 monofilaments. In this case, the "pull-out resistance" would be greater than for a single small diameter monofilament due to the larger effective circumferential bonding area of the bundle of monofilaments and the greater frictional resistance to withdrawal derived from their continuity, undulating pattern, and, in the case of scrim, their intermittent points of mutual attachment. It should be noted that "ends" containing fewer than 200 monofilaments may be procured, although initially at a premium price, depending on the cost of this departure from current manufacturing practice.

The improved wallboard of this invention is adapted to be made upon and the improved process is adapted to be practiced upon existing wallboard making machines with certain modifications as will be further and more fully described herein. But this does not preclude the attachment of the reinforcing fiber to the sheet paper stock to comprise a unit.

In FIG. 2, there is schematically shown a gypsum wallboard making machine 19 on which the process of the invention may be practiced and the gypsum board of the invention made. In this apparatus, the back or top paper cover sheet 14 is contained on a roll 14a adjacent the forward or right-hand end of the machine 19 and the front or bottom paper cover sheet 16 is contained on a roll 16a toward the back or rear side of the machine at the left of the drawing in FIG. 1. In the usual board making machine, the bottom cover sheet 16 is drawn from the roll 16a over a series of support or back up rollers 20, 21, 22, 23 and 24. It will be understood that these rollers are illustrated schematically only and that there may be a number of rollers or supporting members intermediate the rollers shown in order to support the paper as it moves through the machine. Above the support roller 22 may be a chute 26 through which the core material 12, in the form of stucco slurry from the mixing unit (not shonw), is conveyed to and spread upon the inner surface or bond liner of the front or bottom cover sheet 16. The front cover sheet with the stucco 12 thereon is then moved forwardly toward the support roller 23. Above the support roller 23 is a roller 28 which in the schematically illustrated machine has a dual function. The back or top cover sheet 14 from the roll 14a extends over and then under the roller 28 into contact with the stucco carried on the bottom cover sheet 16. The roller 28 thus serves to guide the back cover sheet 14 into contact with the stucco, and it further determines the thickness of the wall board being formed because the surface of this roller is spaced from the surface of the roller 23 by a distance equal to the desired thickness of the finished gypsum board. Thus the stucco 12 which forms the core of the board is squezed or pressed between the cover sheets 14 and 16 by the rollers 23 and 28, and as the uncured board moves through the machine it passes between a number of finishing devices or rolers such as rollers 24 and 30. The board is then dried in high temperature kilns.

The present invention involves the incorporation of reinforcng fibers having certain characteristics into the wallboard primarily at the interface between the stucco slurry or core and the inner surface or bond liner of at least one of the paper cover sheets. In order to assure that the reinforcing fibers are properly positioned at the interface, these fibers may be adhesively secured to the bond liner before the bond liner is brought into contact with the stucco slurry. In pendng patent application of William J. Long, Ser. No. 221,324, filed Jan. 27, 1972, co-owned with the instant application, there is disclosed a process for improving the bond between the paper cover sheets and the gypsum core through the use of adhesives applied to the cover paper. The process of that application is characterized by the coating of adhesive onto the paper cover sheet before the cover sheets reach the board machine. The adhesive is applied in a discrete, spaced apart pattern, so that it does not interfere with wet bonding when the precoated sheet passes into the board machine. As applied to the instant application, the tackiness of the adhesive must be sufficient to adhere the fibers to the surface of the cover sheets. Therefore, in the embodiment illustrated in FIG. 2, an adhesive emulsion, for instance, in the form of polyvinyl acetate emulsion or other adhesive such as a hot-melt adhesive, is used in addition to or possibly in place of the starch adhesives described in the aforesaid application Ser. No. 221,324. Adhesive emulsions may be sprayed onto the bond liner of the cover sheets 14 and 16 by means of sprayers 32 and 34 respectively. However it is applied, it must form a pattern characterized by discrete, spaced apart locations of the adhesive. This can be done so that the maximum distance between adhesive "spots" is on the order of one-fourth of an inch, so that the length of the fibers will insure anchorage of most of them to the sheet somewhere along the length of the fibers.

In the schematically illustrated embodiment of FIG. 2, the reinforcing fibers are continuous filament fibers 18, which are fed from a plurality of bobbins 36 and are guided into contact with the adhesively coated cover sheets 14 and 16 by suitable guide means 38 and 40, respectively. In this embodiment, the fibers are laid in a pair of crossing undulated or zigzag patterns to form a reinforcing structure which resembles an open net. The bobbins 36 may be mounted on vertical spindles 42 which extend upwardly from suitable support members 44 and 45 located above the back and front cover sheets 14 and 16, respectively. Each support member 44 and 45 accommodates two sets of bobbins 36, one set for each undulated fiber pattern. However, in FIG. 2, only one set of bobbins is shown on each support member, the other set having been broken away for illustration purposes. The guide means 38 is carried on an arm 46 which is pivotally connected to the support 44 and this guide means includes a first guide bar 48 located above the plane of the top cover sheet 14. The first guide bar 48 is adapted to engage and guide the fibers from the set of bobbins 36 shown in FIG. 2. One end of the bar 48 is a rack 48a driven by a pinion 50 attached to the output shaft 52a of a motor 52. A second guide bar 54 attached by another arm (not shown) to the support member 44 is adapted to engage and guide the fibers from the second set of bobbins 36 (not shown). The second guide bar 54 has a rack 54a at one end which is in engagement with the pinion 50. The motor 52 is reversible and is driven to reciprocate the guide bars 48 and 54 in opposite directions transverse to the direction of movement of the cover sheets and wallboard through the machine 19 (i.e., the "machine direction") as indicated by the arrows. The guide bars 48 and 54 are reciprocally moved in their opposed transverse directions as the top cover sheet 14 is moved longitudinally in the machine direction, and thus the reinforcing fibers 18 are diagonally laid onto the inner surface or bond liner of the top cover sheet 14 in a pair of crossing undulated or zigzag patterns.

It will be appreciated that reciprocating guide bars are but one means for guiding the reinforcing fibers 18 onto the paper. In some instances, it may be desirable to have a longitudinally straight rather than a crossing undulated (diagonal) pattern. However, since it is preferred to reinforce the board in a transverse direction, which is normally the weakest direction and is transverse to the direction of orientation of the fibers in the paper cover sheet, this is best done by a pattern which extends at least partially in the transverse direction, as distinguished from a pattern in which the fibers are all extending in a longitudinal direction. The pattern, of course, may be varied and may be the same or different from the pattern used for the front cover sheet 16. From the first and second guide bar 48 and 54 the reinforcing fibers 18 may be passed beneath the roller 56 which cooperates with the underlying roller 28 to press the fibers against the adhesively coated bond liner of the top or back cover sheet 14. If desired, roller 56 may be omitted and the fibers will be held in place by tension (and adhesion) as they pass over the roller 28.

The guide means 40 for laying down the pattern of fibers on the bond liner of the bottom cover sheet 16 may be identical to the guide means 38, just described. Again only one set of bobbins 36 is shown on the support member 45, the other set having been removed for illustration purposes. The guide means 40 is carried on an arm 58 which is pivotally connected to the support 45 and this guide means includes a first guide bar 60 located above the plane of the bottom or front cover sheet 16. This first guide bar is adapted to engage and guide the fibers from the first set of bobbins 36 which is shown in FIG. 2. One end of the bar 60 is a rack 60a driven by a pinion 62 attached to the output shaft of a reversible motor 64. A second guide bar 66 attached by another arm (not shown) to the support member 45 is adapted to engage and guide the fibers from the second set of bobbins 36 (not shown in FIG. 2). The second guide bar 66 has a rack 66a at one end which is in engagement with the pinion 62. Reciprocation of the motor 64, which may be electrically or mechanically synchronized to the operation of the motor 52, causes the guide bars 60 and 66 to reciprocate in opposite directions transverse to the direction of movement of the front paper cover sheet 16. Thus the reinforcing fibers 18 are diagonally laid onto the bond liner of the front cover sheet 16 in a pair of crossing undulated or zigzag patterns.

The fibers 18 laid down by the concurrent longitudinal movement of the front cover sheet 16 and the transverse opposed movement of the guide bars 60 and 66 pass between the press down roller 68 and the support roller 21 which press the fibers against the adhesively coated bond liner of the front cover sheet 16. The cover sheet 16 with the pattern of fibers 18 adhesively secured thereto is then passed beneath the slurry chute 26 where the stucco slurry 12 is applied thereto.

Alternatively, the fibers may be guided onto the sheet 16 from a position below the plane of the sheet as it passes over roller 21, thus permitting tension to secure the fibers in place, as will be appreciated. In that case, roller 68 may be omitted.

Figure 4:
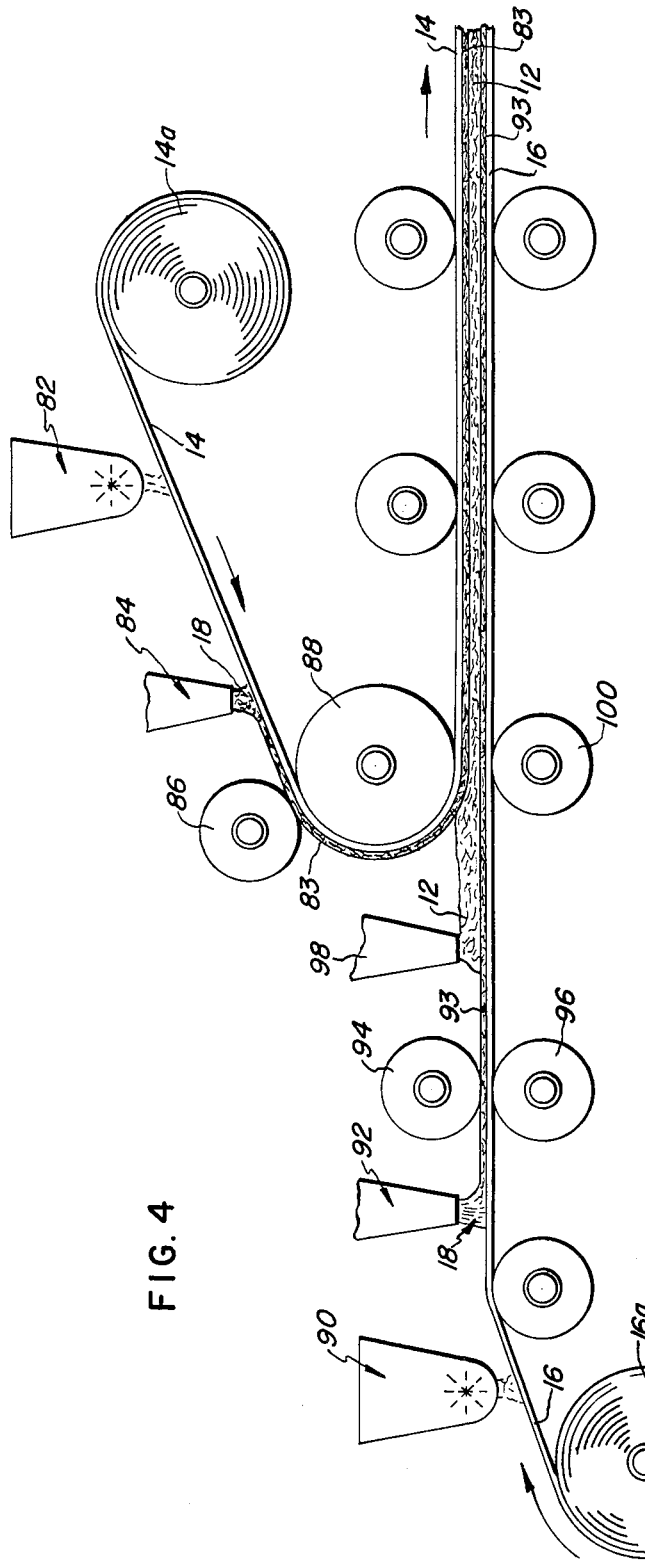
FIG. 4 is a schematic side elevation view of another wallboard machine showing the incorporation of another modified fiber reinforcement into the board at the interface between the core and cover sheets.
Figure 3:
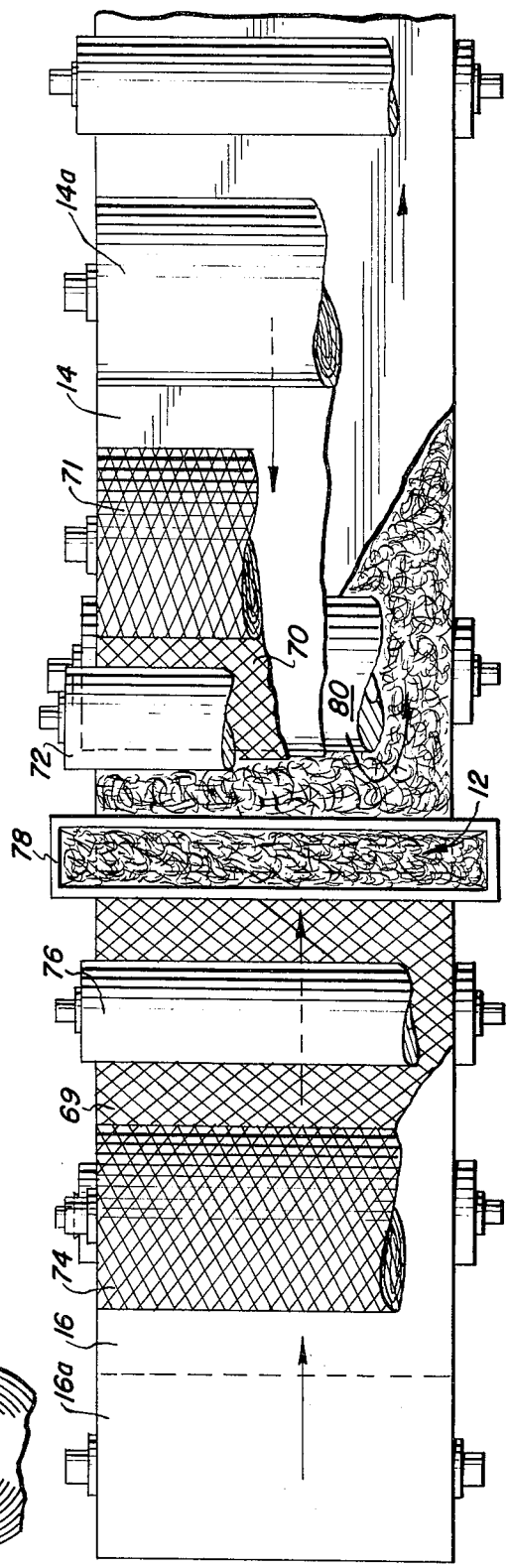
FIG. 3 is a schematic top plan view of a gypsum wallboard machine showing the incorporation of a slightly modified fiber reinforcement into the board at the interface between the core and cover sheets.

FIGS. 3 and 4 show various alternative embodiments of the process. These alternatives differ primarily in the form of the reinforcing fibers. In FIG. 3, the reinforcing fibers 18 are preformed into a bottom or front scrim or fish net 69 and a top or back scrim 70. The back scrim 70 is carried on a roll 71 and is unrolled with the back cover sheet 14 from the roll 14a. The bond liner of the back cover sheet 14 may be precoated with adhesive, in accordance with the teaching of application Ser. No. 221,324, so that the scrim 70 may be adhesively attached thereto, or alternatively the scrim 70 may be simply held in place by is own weight and tension around roller 28. The back scrim 70 may be pressed into contact with the adhesively coated bond liner of the back cover sheet 14 by means of a pressure roller 72. The front scrim 69 is unrolled from a scrim roll 74 and is laid over the bond liner of the front cover sheet 16 taken from the roll 16a. The bond liner may be adhesively coated, if adhesive attachment of the scrim thereto is desired. The front scrim 69 and the front paper cover sheet 16 may be pressed together by means of a pressure roller 76. The stucco core slurry 12 is fed downwardly through a chute 78 to the top surface of the front cover sheet 16 to which the front scrim 69 has been adhesively attached. As the front cover sheet 16 with the scrim 69 and the stucco slurry 12 thereon is moved beneath the roller 80 the top cover sheet 14 with the scrim 70 adhesively attached thereto is moved into contact with the stucco slurry forming the core of the board. Thus the front scrim 69 is deposited at the interface between the stucco core slurry and the front cover sheet 16, and the back scrim 70 is deposited at the interface between the back cover sheet 14 and the stucco slurry.

In FIG. 4, another slight modification of the process is schematically illustrated. In this case the fibers 18 in random orientation are deposited (i.e., flocked) as a thin open mat 83 onto the surface of the cover sheets after the cover sheets have been coated with additional adhesive so that the flocked fiber mat will stay in place. Optionally, electrostatic flocking may be used. The fibers of the mat 83 have an average length exceeding the "critical fiber length", and the flocking is a very open flocking so that the stucco slurry or core matrix will intimately contact the cover sheet surface through the flocking. In the illustrated apparatus on which this embodiment of the process is carried out, the back cover sheet 14 from the roll 14a is subjected to an adhesive spray from a spray unit 82, and after the adhesive has been applied the paper is moved beneath a flocking unit 84 for the application of fibers as a thin open mat 83 to the adhesively coated surface of the paper. The unit 84 may apply the fibers by blowing them onto the surface of the back cover sheet 14. The fibers may be pressed down into intimate contact with the adhesive coated surface of the back cover sheet 14 by means of a press roller 86 acting against the dual purpose roller 88 therebeneath. The function of this roller 88 has been previously described in connection with the first embodiment. Similarly, the front cover sheet 16 from the roll 16a is moved beneath a spray unit 90 which sprays adhesive onto the surface of the cover sheet. The adhesively coated front cover sheet is then moved beneath the flocking unit 92 which blows or otherwise applies the fibers as a thin open mat 93, and thereafter the press roller 94 acting against a support roller 96 presses the flocked fiber mat 93 into intimate contact with the adhesively coated surface of the front cover sheet 16. Optionally, the fiber's weight or electrostatic flocking process may be used in lieu of adhesive. The bottom cover sheet 16 with the flocked fiber mat secured thereto is then moved beneath the chute 98 where the stucco core slurry 12 is applied. The front cover sheet 16 with the fiber mat 93 and the stucco slurry or core matrix thereon is then moved between the dual purpose roller 88 and the support roller 100 to press the core matrix into intimate contact with the back and front cover sheets 14 and 16 which have the flocked fiber mats 83 and 93 attached thereto. Thus the flocked fiber mats 83 and 93 which are affixed to the back and front cover sheets 14 and 16, respectively, are disposed at the interface between the interior surfaces or bond liners of the respective cover sheets and the stucco slurry forming the core 12 for the board.

The reinforcing fibers 18 in all instances described herein have an average length greater than the "critical fiber length" and the fibers at the interface between the core and bond liner must in all instances be sufficiently open or porous so that there is uniformly good contact between the core and cover paper. Otherwise, there is apt to be a weakness in the wallboard paper-to-core bond with accompanying peelers wherein the cover sheets peel cleanly from the core without adhering to any of the gypsum or "blows" wherein the paper separates in spots during the kiln heating. It has been found that if the fibers are applied at the rate of approximately 6 to 24 pounds per thousand square feet of interface, a satisfactory result is achieved with the upper limit of the amount of fibers being only limited by the necessity for porosity and good contact between the core matrix and the cover paper. But in the case of scrim or continuous strand reinforcement, the upper limit may be appreciably higher since these reinforcements may contain numerous monofilaments arranged in a way that does not adversely affect porosity and intimate contact.

In all of the embodiments described, the reinforcing fibers have been incorporated both at the core and bottom or front cover sheet interface and at the core and top or back sheet interface. In many instances, it may be desirable to incorporate the fibers only at the core and front sheet interface. This would, for example, improve the scoring and breaking properties of the board because the scoring would usually penetrate the reinforcing fibers located at the front sheet-core interface.

By incorporating the reinforcing of glass fibers into the wallboard at the interface of the core and the bond liner of one of the cover sheets, it has been found that the ultimate strength of the composite board is increased from about 9% to about 30% depending upon the amount of fibers used. When the fibers are added at the rate of 6 to 12 pounds per thousand square feet, approximately a 9% increase in the ultimate strength may be obtained, and when the rate of 24 pounds per thousand square feet is employed approximately a 30% increase in the ultimate strength may be obtained. As even more significant increase in mechanical properties was found to occur after the board had been loaded to its ultimate strength and the paper cover sheets have failed. Measuring the flexural strength of the specimen after such cover sheet failure, it has been found that specimens of reinforced wallboards constructed in accordance with this invention can sustain loads of between about 40% and about 60% of the ultimate load of standard gypsum wallboard control specimen. This is shown in Table I below which are the results of flexure tests made upon specimens of gypsum board prepared in accordance with the invention and upon standard gypsum wallboard control specimens. In the case of board from which the reinforced specimens A, B and C were taken, glass fiber roving was cut 12 inches long and partially manually separated. This open roving was sprayed with a diluted polyvinyl acetate emulsion and then pressed onto the face paper inner surface (bond liner). The boards thus prepared were 12 × 18 × ½ inch (thick), and these boards varied in accordance with the amount of fiber used, i.e., 6 pounds per MSF, 12 pounds per MSF and 24 pounds per MSF. All were compared to standard wallboard specimens prepared without the utilization of reinforcing fibers at the interface in accordance with this invention. Two flexure test specimens 5 × 18 inches were cut from each board. Each specimen was tested as a simple beam loaded at the center of a 14 inch span by means of a Tinius-Olsen Universal Testing Machine. The results were averaged and are as follows:

TABLE I

| TEST SPECIMEN | AVERAGE ULTIMATE LOAD (LBS) | AVG. % INCREASE IN ULTIMATE LOAD* | AVERAGE LOAD SUSTAINED AFTER PAPER FAILURE (LBS) | SUSTAINED LOAD AS % OF ULTIMATE LOAD* |
|---|---|---|---|---|
| Control (0 lb/MSF) | 91.87 | 0 | 0 | 0 |
| A (6 lb/MSF) | 100.12 | 9.0 | 39.12 | 42.6 |
| B (12 lb/MSF) | 103.25 | 12.4 | 45.00 | 49.0 |
| C (24 lb/MSF) | 119.25 | 29.8 | 55.00 | 59.9 |

*(Compared to Ultimate Load of Control)

It may be seen from the test results that one of the advantages of the incorporation of reinforcing fibers greater than the critical fiber length at the interface between the paper cover sheets and the core is an increase in the ultimate strength in flexure. However, an even more significant advantage is seen in an increase in the flexural strength of the board after the paper failure. There are a number of additional advantages.

The process of this invention enables the reinforcing fibers to be incorporated where they will do the most good and without requiring any further additions of water to the stucco slurry, if reinforcing fibers are added to the slurry at the desirable level. In addition, the disposition of the reinforcing fibers at the interface between the bond liner of the cover sheets and the core results in a gypsum board which has excellent scoring and breaking properties and the use of fiberglass for reinforcement provides increased fire retardation for the composite wallboard even after the paper liner has burned off. Finally the reinforcement may be provided not only in the machine direction but also in the transverse direction. When in accordance with the present invention the fibers are applied directly to the cover sheets and particularly when they are adhesively secured to the cover sheets, the orientation may be predetermined and there is no tendency for this orientation to change during the manufacturing process. There is a tendency for short reinforcing fibers to orient themselves in the machine direction when they are an integral component of the core slurry.

Although the invention has been described with a certain degree of particularity, it will be understood by those skilled in the art that many modifications may be made therein without departing from the true spirit and scope of the invention which is defined by the appended claims.

What is claimed is:

1. In a gypsum board having a set gypsum core securely bonded to paper cover sheets; the improvement comprising a plurality of glass reinforcing fibers in the gypsum core wherein a majority of said fibers are disposed immediately adjacent the interface of the core and at least one of the cover sheets, said fibers being of an average length sufficiently great so that they are frictionally gripped by the core with such force that said fibers will break off rather than pull out of the core when said fibers are subjected to external tension, and being bonded to the cover sheet.

2. The improved gypsum board as defined in claim 1 wherein the average length of said fibers is greater than twice the length defined in claim 1.

3. The improved gypsum board as defined in claim 1 wherein said fibers are on the average greater than 10 inches in length for a core density of about 40 lbs./cu. ft.

4. The improved gypsum board as defined in claim 1 wherein said fibers are oriented at least partially in a direction transverse to the orientation of the fibers in the paper cover sheet.

5. The improved gypsum board as defined in claim 1 wherein said fibers are disposed at the interfaces of each of the two cover sheets and the core.

6. The improved gypsum board as defined in claim 5 wherein said fibers are disposed at the interface in an amount of at least 3 pounds per 1000 square feet of interface yet insufficient to adversely affect the bond between the core and cover sheet.

7. The improved gypsum board as defined in claim 1 wherein said fibers are in the form of substantially continuous strands.

8. The improved gypsum board as defined in claim 7 wherein said strands are undulated.

9. The improved gypsum board as defined in claim 1 wherein said fibers are glass and are in the form of an open fiber mat.

10. The improved gypsum board as defined in claim 9 wherein said fibers are in the form of a scrim.

11. The improved gypsum board as defined in claim 9 wherein said fibers are in the form of a chopped strand mat with random fiber orientation.

12. The improved gypsum board as defined in claim 1 wherein said fibers are bonded to the cover sheet by starch.

13. The improved gypsum board as defined in claim 1 wherein said fibers are bonded to the cover sheet by polyvinyl alcohol.

14. The improved gypsum board as defined in claim 1 wherein said fibers are incorporated into the portion of the core only adjacent the cover sheet.

* * * * *